United States Patent
Do (10) Patent No.: US 10,621,525 B2
(45) Date of Patent: Apr. 14, 2020

(54) METHOD FOR SOLVING MODEL-BASED PLANNING WITH GOAL UTILITY DEPENDENCIES

(75) Inventor: Minh Binh Do, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 952 days.

(21) Appl. No.: 11/824,372

(22) Filed: Jun. 29, 2007

(65) Prior Publication Data

US 2009/0006166 A1  Jan. 1, 2009

(51) Int. Cl.
  *G06Q 10/06* (2012.01)
  *G06F 3/12* (2006.01)
  *G06N 5/00* (2006.01)

(52) U.S. Cl.
  CPC ....... *G06Q 10/06312* (2013.01); *G06F 3/126* (2013.01); *G06F 3/1263* (2013.01); *G06F 3/1275* (2013.01); *G06Q 10/06* (2013.01); *G06Q 10/0637* (2013.01); *G06Q 10/06375* (2013.01); *G06N 5/003* (2013.01)

(58) Field of Classification Search
  None
  See application file for complete search history.

(56) References Cited

U.S. PATENT DOCUMENTS

| | | | |
|---|---|---|---|
| 6,263,277 B1 * | 7/2001 | Tanimoto et al. | 701/209 |
| 6,553,360 B1 * | 4/2003 | Hoekstra | 706/47 |
| 6,573,910 B1 * | 6/2003 | Duke | G06F 9/4843 358/1.14 |
| 6,895,292 B2 * | 5/2005 | Fromherz et al. | 700/101 |
| 6,898,475 B1 * | 5/2005 | Ruml et al. | 700/103 |
| 2002/0184166 A1 * | 12/2002 | Jackson et al. | 706/14 |
| 2002/0184176 A1 * | 12/2002 | Fromherz et al. | 706/45 |
| 2005/0108032 A1 * | 5/2005 | Josephsen | G06Q 30/02 705/400 |
| 2006/0268318 A1 * | 11/2006 | Lofthus | G06F 3/1208 358/1.15 |
| 2007/0043607 A1 * | 2/2007 | Howard et al. | 705/10 |
| 2007/0129834 A1 * | 6/2007 | Howard et al. | 700/103 |
| 2008/0071716 A1 * | 3/2008 | Anderson et al. | 706/45 |
| 2008/0103866 A1 * | 5/2008 | Wiener | G06Q 10/06 705/7.24 |

OTHER PUBLICATIONS

Van den Briel, "Effective Approaches for Partial Satisfaction (Over-Subscription) Planning," 2004, In Nineteenth National Conference on Artificial Intelligence (AAAI), pp. 562-569.*

(Continued)

*Primary Examiner* — Ivan R Goldberg
(74) *Attorney, Agent, or Firm* — Fay Sharpe LLP (57) ABSTRACT

The presently described embodiments provide a systematic approach for handling cost and utility dependencies together in PSP. In particular, the following are provided: an approach for representing utility dependencies between planning goals using the Generalized Additive Independence (GAI), combining utility theory and deterministic planning and, a novel heuristic framework combining cost propagation and IP encoding to capture mutual dependencies of goal achievement cost and goal utility. This leads to informative heuristic estimates guiding a variation of forward state space search planer that solves PSP problems described above.

22 Claims, 3 Drawing Sheets

(56) References Cited

OTHER PUBLICATIONS

Smith, "Choosing Objectives in Over-Subscription Planning," 2004, Proceedings of ICAPS-04, pp. 393-401.*
Hoffman, "FF: The fast-forward planning system," 2001, AI Magazine, vol. 22, No. 3, pp. 57-62.*
Dasgupta, "Searching Networks with Unrestricted Edge Costs," 2001, IEEE Transactions on Systems, Man and Cybernetics—Part A: Systems and Humans, vol. 31, No. 6, pp. 497-507.*
Blum, "Fast planning through planning graph analysis," 1997, Artificial Intelligence, vol. 90, pp. 281-300.*
Boutilier, "CP-nets: A Tool for Representing and Reasoning with Conditional Ceteris Paribus Preference Statements," 2004, Journal of Artificial Intelligence Research, vol. 21, pp. 135-191.*
Do, "Sapa: A Scalable Multi-objective Heuristic Metric Temporal Planner," 2003, Journal of Artificial Intelligence Research, pp. 155-194.*
Fromherz, "Model-based Computing for Design and Control of Reconfigurable Systems," 2003, Palo Alto Research Center, Published in AI Magazine, Special Issue on Qualitative Reasoning, vol. 24, pp. 120-130.*
Thittamaranahalli, "Contributions to Algorithmic Techniques in Automated Reasoning About Physical System," Mar. 2005, Stanford University, Department of Computer Science.*
Do—Partial Satisfaction Planning, "Partial Satisfaction (Over-Subscription) Planning as Heuristic Search," 2004, Proceedings of KBCS-04.*
Bacchus, "Graphical models for preference and utility," 1995, In Proceedings of UAI.*
Do—Temporal Plans, "Improving the Temporal Flexibility of Position Constrained Metric Temporal Plans," 2003, Proceedings of ICAPS '03, pp. 42-51.*
Do, "Partial Satisfaction (Over-Subscription) Planning as Heuristic Search," 2004, Proceedings of KBCS-04.*
Benton, "Solving Goal Utility Dependencies* and Simple Preferences in Partial Satisfaction Planning," 2006, in Doctoral Consortium of the International Conference on Automated Planning and Scheduling (ICAPS 2006.*
Do, "Improving the Temporal Flexibility of Position Constrained Metric Temporal Plans," 2003, Proceedings of ICAPS '03, pp. 42-51.*
Benton, "Solving Goal Utility Dependencies* and Simple Preferences in Partial Satisfaction Planning," 2006, in Doctoral Consortium of the International Conference on Automated Planning and Scheduling (ICAPS 2006), pp. 16-18.*
Bonet et al., "A Robust and Fast Action Selection Mechanism for Planning," In Proceedings of AAAI-97, pp. 8-14, 1997.
Boutilier et al., "Decision-Theoretic Planning: Structural Assumptions and Computation Leverage," Journal of Artificial Intelligence Research (JAIR), 11:1-94, 1999.
Boutilier et al., "Reasoning with Conditional Ceteris Paribus Preference Statements," In Proc. of UAI-2001, pp. 71-80, 2001.
Boutilier et al., "UCP-Networks: A Directed Graphical Representation of Conditional Utilities," In Proc. of UAI-2001, pp. 56-64, 2001.
Brafman et al., "Eliciting, Modeling, and Reasoning about Preference using CP-nets," Tutorial at UAI-2004, 103 pages, 2004.
Brafman et al., "Planning with Goal Preferences and Constraints," In Proceeding of ICAPS-05, 10 pages, 2005.
Bylander, "The computational complexity of propositional STRIPS planning," Artificial Intelligence Journal, 69:165-204, 1994.
Do et al., "Sapa: A Domain-Independent Heuristic Metric Temporal Planner," In Proc. of ECP-01, pp. 57-68, 2001.
Gerevini et al., "Fifth International Planning Competition," In IPC06 Booklet, 83 pages, 2006.
Hoffman et al., "The FF Planning System: Fast Plan Generation Through Heuristic Search," JAIR, 14:253-302, 2001.
Long et al., "The $3^{rd}$ International Planning Competition: Results and Analysis," Journal of AI Research, 20:1-59, 2003.
Long et al., "Exploiting a Graphplan Framework in Temporal Planning," In Proceedings of ICAPS-2003, pp. 52-61, 2003.
Nigenda et al., "Planning Graph Heuristics for Selecting Objectives in Over-subscription Planning Problems," In Proceedings of ICAPS-05, 10 pages, 2005.
Nisan, "Bidding and Allocation in Combinatorial Auctions," In Proc. of ACM conf. on Electronic Commerce, pp. 1-12, 2000.
Van de Briel et al., "Reviving Integer Programming Approaches for AI Planning: A Branch-and-Cut Framework," In Proceedings of AAAI-04, 10 pages, 2004.
Williamson et al., "Optimal Planning with a Goal-Directed Utility Model," In Proc. of AIPS-94, pp. 176-181, 1994.
Wolfman et al, et al., "The LPSAT Engine & its Application to Resource Planning," In Proceedings of IJCAI-99, pp. 310-316, 1999.

* cited by examiner

FIG. 1

APPROXIMATE THE RELAXED PLAN WITH THE BEST
UTILITY-COST TRADEOFF

FIG. 2

RELAXED PLAN    ALL REMAINING
                     GOALS

FIG. 3

BUILD THE SUPPORTED GOAL SET: $GS(A_1) = \{G_3\}$, $GS(A_2) = \{G_1, G_2, G_3\}$

FIG. 4

REMOVING COSTLY GOALS AND ACTIONS (SOLELY) SUPPORTING THEM

SET UP AND SOLVE AN IP ENCODING USING GS(A) AND
GOAL UTILITY DEPENDENCIES FUNCTIONS f(S)

METHOD FOR SOLVING MODEL-BASED PLANNING WITH GOAL UTILITY DEPENDENCIES

BACKGROUND

In over-subscription planning, goals have utilities, actions have costs and the objective function is to find a plan satisfying a subset of goals that maximizes: (TotalGoalUtility−TotalActionCost). In many applications, goal utilities are not additive (i.e. not independent).

Classical planning aims at finding a plan that achieves a set of conjunctive goals. Partial satisfaction planning (PSP) relaxes this all-or-nothing constraint, focusing on finding a plan that achieves the "best" subset of goals (i.e. the plan that gives the maximum trade-off between total achieved goal utilities and total incurred action cost). The process of finding goals on which to focus is complicated by the fact that they interact with one another. For instance, actions may share in their achievement of goals (positive interaction) or conflict (negative interaction). These types of interactions introduce "cost dependencies" between goals because the total cost of achieving them separately may differ from the cost of achieving them together. In the existing frameworks, goals only interact through cost dependencies.

In reality, however, cost dependences are not the only types of dependencies that impact planning. Utility dependencies also impact planning. Two concrete examples of utility dependency are mutual dependency and conditional dependency. For mutual dependency, the utility of a set of goals is different from the sum of the utility of each individual goal. For example, (1) while the utility of having either a left or right shoe alone is zero, utility of having both of them is much higher (i.e. the goals "complement" each other); (2) utility of having two cars is smaller than the sum of the individual utilities of having each one of them (i.e. the goals "substitute" each other). Conditional dependency is where the utility of a goal or set of goals depend on whether or not another goal or set of goals is already achieved. For example, the utility of having a hotel reservation in Hawaii depends on whether or not we have already purchased a ticket to Hawaii.

The main technical challenges in handling utility dependencies are in finding (1) a model where different types of goal utility dependencies can be compactly expressed and (2) an approach that effectively combines utility interactions with cost interactions to find a high quality plan.

There has been work on PSP problems using orienteering to select goal subsets by David Smith. Also, van den Briel et al. introduced several planners such as AltAltPS, SapaPS, and Optiplan that tackle PSP by either greedily selecting goals up-front, heuristically searching for solutions, or compiling the problem into Integer Programming (IP). None of these planners deal with utility dependencies, however. The most recent International Planning Competition (Alfonso Gerevini, Blai Bonet and Bob Givan, *Fifth international planning competition*, IPC06 Booklet, 2006) included problems with preferences that involved indicating costs on plans that failed to meet preferred constraints. Also, PrefPlan (Ronen I. Brafman and Yuri Chernyavsky, *Planning with goal preferences and constraints*, Proceeding of ICAPS-05, 2005. can find optimal plans with preferences between goals.

There are several other known models such as UCP-Net (C. Boutilier, R. Brafman, H. Hoos and D. Poole, *Reasoning with conditional ceteris paribus preference statements*, Proc. Of UAI-2001, 2001.) and the graphical model. While both provide a graphical representation that can make it easier for users to understand dependencies, the GAI model is more general and these modeling methods can be compiled into GAI. We also note that PDDL3 (Alfonso Gerevini, Blai Bonet and Bob Givan, *Fifth international planning competition*, IPC06 Booklet, 2006) can represent GAI utility dependencies, albeit in an unnatural way.

It is possible to solve PSP problems by modeling them as MDPs and extracting a solution from an optimal policy. However, past experiments have shown this approach fails to scale well even when solving problems without utility dependencies on state-of-the-art MDP solvers.

The inventor is not aware of work using IP encoding in combination with greedy search for heuristic for planning. However, there has been work on using IP encoding to handle a subset of planning constraints involving continuous resource or temporal variables.

In combinatorial auctions, the utility for a set of items up for bid are normally non-additive and share many similarities with reasoning about sets of goals that are dependent in PSP. While a bidding process is different from planning, the bidding language can be used to represent utility dependencies in PSP_UD.

The presently described embodiments describe a method to solve the over-subscription planning problems where there are dependencies between goal utilities.

BRIEF DESCRIPTION

The presently described embodiments provide a systematic approach for handling cost and utility dependencies together in PSP. In particular, the following are provided:

An approach for representing utility dependencies between planning goals using the Generalized Additive Independence (GAI), combining utility theory and deterministic planning.

A novel heuristic framework combining cost propagation and IP encoding to capture mutual dependencies of goal achievement cost and goal utility. This leads to informative heuristic estimates guiding a variation of forward state space search planer that solves PSP problems described above.

In one aspect of the presently described embodiments, a method comprises heuristically searching for plans in the present of dependencies between goals, heuristically determining a relaxed plan of actions to accomplish the set of goals, determining cost dependencies of the actions to achieve the goal set, and, determining an optimal plan of action from the relaxed plan of actions based on the cost and utility dependencies.

In another aspect of the presently described embodiments, the method comprises progression (forward chaining), regression (backward chaining), or partial order planning.

In another aspect of the presently described embodiments, the dependencies between goals are in the form of mutual dependencies or conditional dependencies.

In another aspect of the presently described embodiments, the dependencies are represented in the general additive independencies, UCP-net or other compatible preference representation framework.

In another aspect of the presently described embodiments, the searching comprises a best-first search or greedy search.

In another aspect of the presently described embodiments, the heuristically determining of the relaxed plan is based on a planning graph and propagated achievement costs.

In another aspect of the presently described embodiments, a heuristic found results allows a planner to find solutions.

In another aspect of the presently described embodiments, the relaxed plan includes goal utility functions.

In another aspect of the presently described embodiments, the determining of the cost dependencies comprises building cost functions.

In another aspect of the presently described embodiments, the determining of the cost dependencies comprises forming a combinatorial optimization problem to determine tradeoff between the goal utility functions and the cost functions.

In another aspect of the presently described embodiments, the determining of the optimal plan comprises removing costly goals and actions.

In another aspect of the presently described embodiments, the determining of the optimal plan includes building and solving an Integer Programming (IP) encoding.

In another aspect of the presently described embodiments, the method further comprises using the optimal plan to achieve a final solution of achieving at least some of the set of goals.

In another aspect of the presently described embodiments, the goals are print jobs and the cost comprise the costs of performing each of the print jobs and the cost dependencies involve cost of printing all jobs and utility dependencies are price given to set of related printing jobs.

In another aspect of the presently described embodiments, a system comprises means for heuristically searching for plans in the present of dependencies between goal, means for heuristically determining a relaxed plan of actions to accomplish the set of goals, means for determining cost dependencies of the actions to achieve the goal set, and, means for determining an optimal plan from the relaxed plan of actions based on the cost dependencies.

In another aspect of the presently described embodiments, the system is a printing system.

DETAILED DESCRIPTION

Work in partial satisfaction planning (PSP) has hitherto assumed that goals are independent, thus implying that they have additive utility values. As noted above, this assumption may not be valid in many real-world problems. The presently described embodiments relate to handling various types of goal utility dependence in PSP. A framework for representing them using a General Additive Independence (GAI) model is provided.

Figure 1:
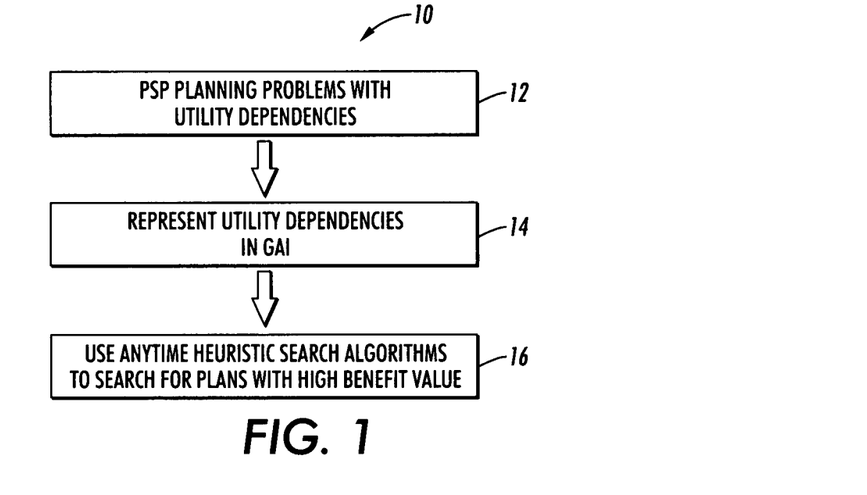
FIG. 1 is a flow chart illustrating method of the presently described embodiments.

FIG. 1 shows the overall framework of this approach. As shown, a method 10 includes, first, identifying a PSP Planning problem having utility dependencies (at 12). Next, the utility dependencies are then represented in General Additive Independence (GAI) format (at 14). Last, Anytime Heuristic Algorithms are used to search for plans with a high benefit value (at 16).

Figure 2:
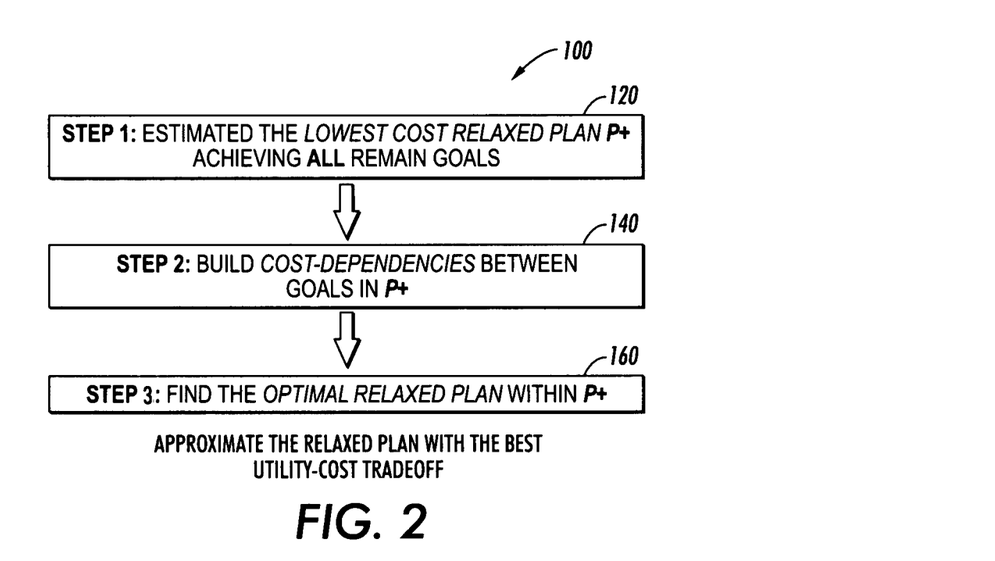
FIG. 2 is an illustration showing part of the method of FIG. 1.

That is, the presently described embodiments use heuristic planning search to solve this problem and the key is to come up with good heuristic estimates. FIG. 2 (described below) illustrates in more details the approach to calculate the heuristic estimate to guide the heuristic search framework solving PSP planning problem, as a part of step 16 outlined in FIG. 1. The costs to achieve different sets of goals are estimated by analyzing the causal structure of the "relaxed" plan, which is easier to find than solving the original planning problem. A combination of the functions representing goal utility and goal achievement cost dependencies (i.e. utility and cost of achieving sets of goals) makes up a combinatorial optimization problem. We then find the largest amount of achievable benefit by solving this problem (e.g. using constraint-based optimization or integer linear programming). The estimated achievable benefit value of the final solution is then used to guide a planning search algorithm such as best-first-search to find the final plan that is optimal or near-optimal in term of overall benefit.

With brief reference to FIG. 2 (which will be described in greater detail below), given the utilities of subsets G' of goals, with G is the set of all desired goals and G'$\subseteq$G, depending on each other (represented as u(G'); also referred as f''(G') in this document), the following is accomplished:

1. Heuristically find a "relaxed" solution $P^+$ guided by goal utility functions u(G'), as determined, for example, at 120 in FIG. 2.

2. Use actions in $P^+$ to build the local functions c(G') representing costs to achieve different goal sets G' (as, for example, at 140 in FIG. 2).

3. Form a combinatorial optimization problem (such as those described herein including IP encoding) of finding a highest (Utility–Cost) tradeoff by combining sets of u(G') and c(G'), and find an optimal solution (plan) $P_{optimal}^+$ for this combinatorial optimization problem (e.g. using constraint-based optimization or integer-linear program encoding) (as, for example, at 160 in FIG. 2).

The overall Benefit=(Utility–Cost) tradeoff of $P_{optimal}^+$ is the heuristic estimate of the highest achievable benefit value of the original planning problem. This is the output of the method 100 of FIG. 2.

The final heuristic value can then guide different planning algorithms (e.g. forward, backward) employing different search strategies (e.g. A*, breadth-first, IDA*) to find the final solution, as (for example) illustrated in FIG. 1.

The contemplated methods of FIGS. 1 and 2 may be implemented in a variety of manners and in a variety of environments involving decision-making and planning. For example, the presently described embodiments may be implemented using various and suitable software routines and/or hardware configurations for controlling planning and decision-making in a processing environment. In one exemplary form, the contemplated method may be implemented in a controller of a device, such as a print controller of a printing system that processes and/or prints images/documents, where the goals are completing printing jobs that may be related to each other, goal utilities are the prices customers are willing to pay for those print jobs and the costs or actions are the costs incurred (e.g. toner cost, machine wears and tears etc.) associated with completing such print jobs. However, it should be well understood that the method of FIGS. 1 and 2 (as well as other methods and variations according to the presently described embodiments) may be used in other suitable planning environments.

Figure 6:
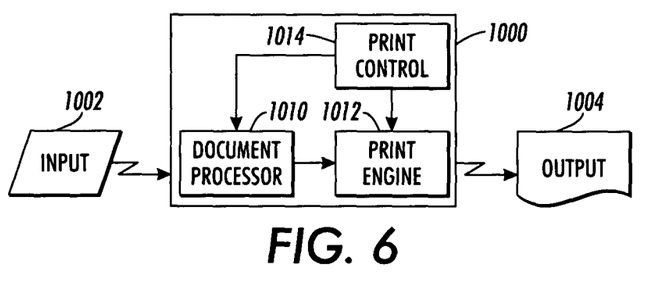
FIG. 6 is a block diagram of an example of a system into which the presently described embodiments may be incorporated.

As a mere example, FIG. 6 illustrates a printing or image rendering system 1000 that receives input 1002 and generates output 1004. Both the input and the output may take a variety of different forms as a function of the precise configuration of the system. In at least one form, the system includes a document processor 1010, a print engine 1012 and a print controller 1014. These components, as well as components not shown, operate in conventional manners to achieve the goal of completing tasks such as print jobs. However, in accord with the presently described embodiments, the print controller (and/or other components such as the document processor) also includes the hardware and/or software necessary to implement the presently described embodiments to improve the planning and scheduling capabilities to complete the set of requested printing jobs. Thus, giving the maximum tradeoff between utility (payments received from customers for their requested jobs) and cost of operating the printing machines to accomplish the jobs.

In one form, the presently described embodiments may be implemented as follows:

Problem Statement:

A classical planning problem is a 4-tuple {F,I,G,A} where: fluents F are a set of predicate symbols; initial state I is completely defined by predicates in F; goal state G is partially defined by a set of predicates in F; a set of actions A are defined by pre-condition Pre(a), which specify conditions that need to be true for action a in A to happen and post-conditions Add(a) and Delete(a), which specify conditions that are made true or false by the execution of action a. A plan P is a sequence of actions that when executed from I achieves all goals g.

With reference to FIG. 1, PSP Planning with utility dependencies is identified at 12. In this regard, in partial satisfaction planning (PSP), (David E. Smith, *Choosing objectives in over-subscription planning*, Proceedings of ICAPS-04, 2004) (Menkes van den Briel, Romeo Sanchez Nigenda, Minh B. Do and Subbarao Kambhampati, *Effective approaches for partial satisfaction (over-subscription) planning*, Proceedings of AAAI-04, 2004.), it is accepted that goals have utility values $U_g \geq 0$ representing how much each goal is worth to the user; each action a in A has an associated execution cost $C_a \geq 0$, representing how costly it is to execute each action (e.g. amount of time or resources consumed). Let Gp be a subset of all goals G achieved by a plan P when is executed from the initial state I.

The objective is to find a plan P that maximizes the difference between total achieved utility and total cost of all actions (i.e., plan benefit):

$$\MAX_P u(G_P) - \sum_{a \in P} C_a \qquad \text{(equation 1)}$$

Work on PSP has until now assumed that goals have no utility dependencies and thus their utilities are additive:

$$u(G_P) = \sum_{g \in G_P} U_g$$

There are many scenarios, however, in which this assumption does not hold.

As indicated at 14 of FIG. 1, to represent the types of goal utility dependencies discussed in the previous section (e.g., complement, substitute, conditional), the Generalized Additive Independence (GAI) model which is well known in the art (F. Bacchus and A. Grove, *Graphical models for preference and utility*, Proceeding of UAI-95, 1995.) is adopted. This model is expressive, general and can be compiled with other commonly used models such as UCP-Net (C. Boutilier, R. Brafman, H. Hoos and D. Poole, *Reasoning with conditional ceteris paribus preference statements*, Proc. Of UAI-2001, 2001.) or other compatible preference representation frameworks. We assume that the utility of the goal set G can be represented by local utility functions $f^u(G_k) \in R$ over sets $G_k \subseteq G$. For any goal subset $G' \subseteq G$ the utility is:

$$u(G') = \sum_{G_k \subseteq G'} f^u(G_k)$$

This model allows users to specify changes in utility over sets of goals. We name the new problem with utility dependencies represented by the GAI model PSP_UD. If there are n=|G|, with n is the number of individual goals, local functions $f^u(G_k) \in R$ and each $G_k$ contains a single goal then PSP_UD reduces to the original PSP problem (no utility dependencies).

Heuristics for Maximizing Plan Benefit

While IP planners are optimal within a bounded horizon, prior work suggests heuristic search planners are faster in general and thus are able to find better solutions in larger problems (Menkes van den Briel, Romeo Sanchez Nigenda, Minh B. Do and Subbarao Kambhampati, *Effective approaches for partial satisfaction (over-subscription) planning*, Proceedings of AAAI-04, 2004.). So, heuristic search algorithms may be used to accomplish the objectives herein (e.g., at 16 of FIG. 1). For PSP_UD problems, the challenge in computing the heuristic is that we need to simultaneously (1) pick the best set of goals and (2) find the best plan for them. While the first challenge is complicated by the utility dependencies, the second is complicated by the cost dependencies. The presently described embodiments use a combination of a greedy search for low-cost relaxed plans that handle cost interactions between goals and a declarative IP encoding that captures both mutual goal achievement cost and goal utility dependencies. We generate an IP encoding over the relaxed plan heuristic rather than the entire problem. By solving the IP encoding, we select a goal set along with the relaxed solution achieving it.

Best-First Heuristic Search for PSP_UD:

To handle PSP_UD, we extend a heuristic best-first anytime heuristic search framework in SAPA (Minh B. Do and Subbarao Kambhampati, *Partial satisfaction (over-subscription) planning as heuristic search*, Proceedings of KBCS-04, 2004). Other greedy types of searches may also be implemented. This forward or progressive metric temporal planner uses an anytime variation of an algorithm referred to as A* guided by a heuristic derived from the relaxed planning graph. However, a regression planner (backward chaining) or a partial order planner may also be used. Like A*, this algorithm starts with the initial state I and continues to dequeue from the open-list the most promising node S (i.e. highest f(S)=g(S)+h(S) value). For each search node S, g(S) represents the benefit achieved so far by visiting S from S init and h(S) represents the projected maximum additional benefit gained by expanding S. While calculating g(S) is trivial, having a good estimate of h(S) is hard and is the key to the success of best-first search algorithms. While exploring the search tree, the algorithm anytime A*, keeps outputting better quality plans whenever a node S with the best-so-far g(S) value is expanded. The benefit of the best found node (i.e. its value) is also used to prune future generated nodes. Like A*, the algorithm terminates when a node S with h(S)=0 is picked from the top of the open list. Thus, there is no additional benefit to expand a given node S.

If we consider heuristic planning search as a graph search problem, then PSP have some interesting properties: (1) the edge cost of moving from a state to state can be negative; (2) any reachable state can be a valid goal state. While there is work by Dasgupsta et. al (Dasgupta, P., Sen, A., Nandy, S., and Bhattacharya, B. Searching Networks with Unrestricted Edge Costs. In Proceedings of IEEE Transactions on Systems, Man, and Cybernetics, 2001) in searching for shortest path in directed acyclic graph with negative edges, a single goal node is still pre-defined. We have not found another graph search algorithm besides that deals with cyclic graphs where all nodes can potentially be destination nodes as in PSP.

One potential drawback of this algorithm is that if the heuristic underestimates the value of a search node S (thus, the estimated achievable benefit by extending S is smaller than the actual achievable benefit), then S can be discarded, when compared to the benefit of the best solution found so far, even if it can be extended to reach a better solution.

To manage this, we keep some search nodes that appear unpromising when first generated. During search, we set a tolerant value e (one example is e is equal to half the distance between the best node found so far and the worst-valued unpromising node). For each unpromising search node S that is within a threshold e of the current best solution $S_B$, we then keep S with probability p which is propositional to how close S is to $S_B$ This is only one exemplary way to keep unpromising nodes due to the inaccuracy of heuristic estimation method.

Figure 3:
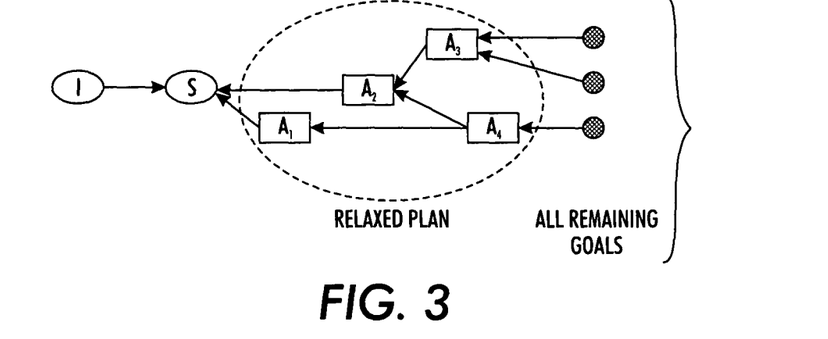
FIG. 3 is an illustration showing part of the method of FIG. 2.

With reference back now to FIG. 2, a method 100 (which comprises a part of 16 of FIG. 1) is shown. Initially, a relaxed plan is estimated for the problem (at 120). This is illustrated in FIG. 3 which shows a relaxed plan of actions A1-A4 that is estimated to achieve all remaining goals of a set of goals S. It should be appreciated that the relaxed plan may be developed using a variety of known techniques as discussed below.

In one form, a planning graph and propagated achievement costs are used.

The first step in extracting a low-cost relaxed plan is to estimate the cost to achieve each goal. Starting with C(f)=0 for facts F in the initial state I and C(f)=C(a)=∞ (infinity) for all other facts and all actions, the propagation rules to estimate costs to achieve facts P and to execute actions a, which is different from the execution cost $C_a$ of a. C(a) is the cost to enable the execution of a and is equals to the cost to achieve preconditions of action a:

$$\text{Facts: } C(f) = \min_{f \in Add(a)} C(a) + C_a$$

Either: 1. Max-propagation $$\forall a \in A : C(a) = \text{MAX}_{f \in Pre(a)} C(f)$$

or 2. Sum-propagation:

$$\forall a \in A : C(a) = \sum_{f \in Pre(a)} C(f)$$

The update rules are used while extending the (relaxed) planning graph structure (A. Blum and M. Furst, *Planning through planning graph analysis*, Artificial Intelligence Journal. 90:281-330, 1997, which is incorporated herein by this reference). The planning graph structure starts with the initial state I and is built gradually by putting in as soon as possible at each time point all actions a that have their preconditions (Pre(a)) presented in the graph, and all facts that are effects of actions already included in the graph. Basically, the planning graph estimates the earliest time at which each action can be executed, and each facts can be achieved. After the propagation is done (i.e., no costs change), C(g) is an estimate on the cost to achieve g for each goal g in G.

It is easy to observe that if we use maximum propagation (max-prop), then C(g) will underestimate the cost to achieve g while there is no such guarantee for propagation (sum-prop). Using C(g) calculated by the cost propagation process outlined in the previous section, we can estimate the achievable benefit value as below:

$$h = \text{MAX}\left[u(G') - \left(\text{MAX}_{g \in G'} C(g)\right)\right]_{G' \subseteq G}$$

If we use max-prop, then the Equation above will give the maximum heuristic $h_{max}$ and if we use sum-prop, it will give a corresponding sum heuristic $h_{sum}$. While $h_{max}$ overestimates the real achievable benefit, there is no such guarantee for $h_{sum}$. Thus, using max-propagation is guaranteed to output an optimal solution given enough time.

Because $h_{max}$ can significantly over-estimate the real benefit of achieving a set of goals, it performs badly in some domains (as we shall see). The heuristic $h_{sum}$, while more informative, relaxes the cost-interaction and assumes that plans achieving different goals are independent and do not overlap. To improve on those two heuristics, we adapt the relaxed plan heuristic, such as one introduced in the FF planner (Joerg Hoffmann and Bernhard Nebel, *The FF planning system: Fast plan generation through heuristic search*, Journal of Artificial Intelligence Research, 14:253-302, 2001, which is incorporated herein by reference.), that solves the planning problem ignoring the delete list (Delete (a)). Because the delete, or negative effects, of actions are ignored, there are less interactions between different actions and thus a plan can be found in polynomial time, instead of exponential time. This heuristic improves over $h_{sum}$ by taking into account actions contributing to the achievement of several goals. The challenge in extending it to PSP_UD is how to efficiently find a high-benefit relaxed plan in the presence of both cost and utility dependencies.

Let $G_{P_+} \subseteq G$ be the set of goals achieved by the optimal (most beneficial) relaxed plan P⁺. The relaxed plan heuristic for PSP_UD is:

$$h_{relax} = \text{MAX}_{P_+} u(G_{P_+}) - \sum_{a \in P_+} C_a \quad \text{(equation 7)}$$

Note that Equation [7] looks like

Equation [1] except that the optimal plan in

Equation [1] is replaced by the optimal relaxed plan P+ (i.e. achieving maximum benefit) in Equation [7]. $h_{relax}$ over-estimates the real achievable benefit and can be used as an admissible heuristic to find the optimal solution for PSP problems.

While finding a satisfying relaxed plan P+ for any given goal set $G_{P+} \subseteq G$ is polynomial, extracting $h_{relax}$ requires finding an optimal relaxed plan (highest benefit). This task is NP-hard even when we already know the optimal goal set and actions have uniform cost. In practice, finding approximates to the optimal $h_{relax}$ has been a very good heuristic for classical planning and PSP problems.

Thus, in one form, Step 1 in FIG. 2 can be computed as follow:

Let G'⊆G be the set of all achievable goals (thus, set of all goals g with C(g)<∞), we use the planning graph and the propagated achievement costs to heuristically extract a low-cost relaxed plan to support G as follows:

Start with supported facts SF=I, subgoal set SG=G'I and the relaxed plan $P^+$=Θ (empty set).

For each g∈SG select a supporting action a: g∈Add(a) with lowest execution cost C(a) value.

Update: $P^+ \leftarrow P^+ \cup \{a\}$, SG←SG∪(Pr e(a)\SF), SF←SF∪Add(a)

Repeat until SG=Θ (empty set)

This backtrack-free process is guaranteed to finish in time polynomial in the number of actions and completes very quickly in practice. FIG. 3 show one example of the relaxed plan extracted using this approach.

Figure 4:
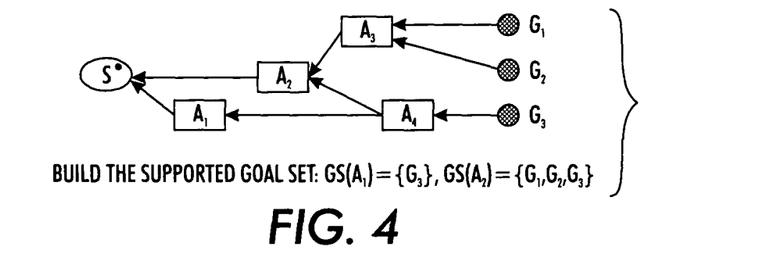
FIG. 4 is an illustration showing part of the method of FIG. 2.

Referring back to FIG. 2, cost dependencies between goals are then built (at 140). This is illustrated in FIG. 4. In this regard, because certain actions A1-A4 contribute to the achievement of multiple goals G1-G3, there are dependencies between the costs to achieve different goals (for example, cost of achieving all goals G1-G3 share action cost A2). Those relations can be discovered by using the causal structure of the extracted relaxed plan P+.

To capture the mutual dependencies between the goal achievement costs, we find the set of actions shared between different partial plans achieving different goals. This procedure utilizes the causal links in the relaxed plan P+.

Initialize:

$\forall a \in P^+: GS(a) = \Theta; \forall p \in Add(a): GS(p) = \Theta; \forall g \in G: GS(g) = \{g\}$ Backward sweep from goals achieved by P+ and update until fix-point:

$$GS(a) = \bigcup_{p \in Add(a)} GS(p)$$

$$GS(p) = \bigcup_{p \in Pre(a)} GS(a)$$

Using the procedure above, for each action a, GS(a) contains the set of goals g that a contributes to, where the goal-supporting sets GS(a) represent the achievement cost dependencies between goals. FIG. 4 shows one example how set GS(a) are updated for different actions in the relaxed plan.

Figure 5:
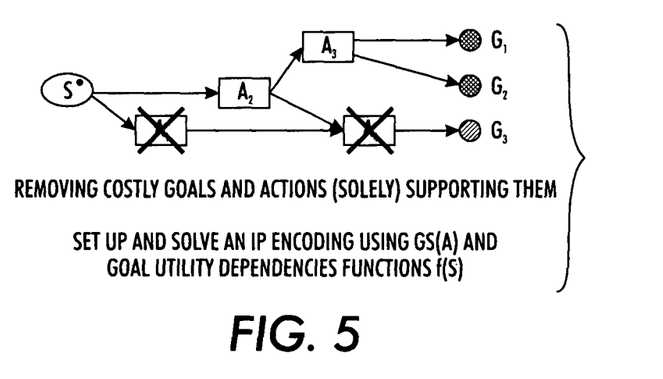
FIG. 5 is an illustration showing part of the method of FIG. 2.

Referring back to FIG. 2, an optimal plan within the selected relaxed plan is then determined (at 160). That is, a maximum achievable benefit is estimated. As shown in FIG. 5, exemplary costly goals and actions are removed.

In this step 160, we combine the goal supporting set found in the previous step with the goal utility dependencies to find the most beneficial relaxed plan within the extracted plan in Step 1. One simple approach to find this plan is to iterate over all possible subsets of goals, and compare the benefit of plans achieving each of those subsets. However, when the number of goals is large this approach becomes impractical. Therefore, we use a declarative approach of setting up an IP encoding with solution representing the most beneficial relaxed plan. Note that while IP is generally slow for solving a complete planning problem, the number of actions in the relaxed plan is much smaller (by several orders) than the number of actions in the (relaxed) planning graph. This allows us to find an optimal solution in reasonable time. This is critical because we will build an IP encoding for each search node generated during forward heuristic search. This IP formulation that we set up only involve actions that are in the relaxed plan and it does not create constraints for negative interactions. Moreover, additional constraints representing the goal supporting set found in the previous step are also included to enforce that if a given goal is selected, then any action that contributes to the achievement of g should also be selected.

Specifically:

Binary Variables: $\forall a \in P, \forall g \in G, \forall G_K \subseteq G$ create one binary integer variable $X_a$, $X_g$, $X_{G_K}$ $\forall a \in P$, $\forall g \in GS(a): (1-X_g) + X_a \geq 1$ Constraints:

$$\sum_{g \in G_K} (1 - X_g) + X_{G_K} \geq 1$$

$$\forall g \in G_K : (1 - X_{G_K}) + X_g \geq 1$$

Objective: MAX $(\Sigma f^u(G_k).X_{G_K} - \Sigma X_a.C_a$

Solving this IP encoding gives the benefit value of the most beneficial relaxed plan within the extracted relaxed plan extracted in Step 2

The benefit of this plan can be used as a heuristic guiding the heuristic search algorithm in FIG. 1.

There is no prior work to solve the described problem of finding good quality plan for planning problems with utility dependencies. So, some alternatives approaches for solving this problem are:

1. Converting the planning problem to the Constraint Based Optimization. This approach has problem finding global optimal solution and also has problem handling continuous values in goal utilities and action costs.

2. Using approach for solving simpler but closest planning problem such as over-subscription planning: this necessitates repeatedly solving the problem for each subset of goals ($2^{|G|}$) which is also impractical.

3. Using human-knowledge to guide search in a particular domain: this approach is not applicable to a wide range of problem, is normally labor-intensive and costly; also may rule out optimal solutions.

The presently described embodiments provide several advantages. For example, a planning domain-independent, flexible approach is provided that can be applied for different forms of utility-dependency representation, can use different types of relaxation for planning heuristic, and can be used in different planning algorithms. Depending on the specific types of heuristic used, the overall algorithm can tradeoff planning time to return optimal or in-optimal solutions.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method to accomplish a set of goals in a system having a controller implementing the method, the controller-implemented method comprising:

heuristically searching a set of nodes for plans having dependencies between goals, the dependencies including utility dependencies represented in a general additive independence model that allows for changes in utility over sets of goals wherein the changes result from the utility of the sets of goals being different from the sum of utility of individual goals or the utility of the sets of goals being dependent on whether at least another goal is achieved and wherein, during search, for each unpromising node that is within a threshold tolerance of a current best solution, the unpromising node is kept with a probability proportional to how close the unpromising node is to the current best solution;

heuristically determining a relaxed plan of actions to accomplish the set of goals;

determining cost dependencies of the actions to achieve the goal set;

determining an optimal plan of action from the relaxed plan of actions based on the cost dependencies and the utility dependencies wherein a heuristic for the optimal relaxed plan is:

$$h_{relax} = \operatorname*{MAX}_{P+} u(G_{P+}) - \sum_{a \in P+} C_a$$

where u(G,) are the utilities of a set of goals achieved by the optimal relaxed plan (P+), a is an action and C, is a cost of an action a; and, controlling, by the controller, a printing or image rendering system pursuant to a sequence of actions in the optimal relaxed plan of action, to complete a set of print jobs.

2. The method as set forth in claim 1 where the method comprises progression (forward chaining), regression (backward chaining), or partial order planning.

3. The method as set forth in claim 1 where the dependencies between goals are in the form of mutual dependencies or conditional dependencies.

4. The method as set forth in claim 1 wherein the heuristically determining of the relaxed plan is based on a planning graph and propagated achievement costs.

5. The method as set forth in claim 4 wherein heuristically found results allow a planner to find solutions.

6. The method as set forth in claim 1 wherein the relaxed plan includes goal utility functions.

7. The method as set forth in claim 3 wherein the determining of the cost dependencies comprises building cost functions.

8. The method as set forth in claim 1 wherein the determining of the optimal plan comprises forming a combinatorial optimization problem to determine tradeoff between utility functions and cost functions.

9. The method as set forth in claim 1 wherein the determining of the optimal plan comprises removing costly goals and corresponding actions.

10. The method as set forth in claim 1 wherein the determining of the optimal plan includes building and solving an Integer Programming (IP) encoding.

11. The method as set forth in claim 1 wherein using the optimal plan achieves a final solution of achieving at least some of the set of goals.

12. The method as set forth in claim 1 wherein the goals are print jobs, the cost dependencies involve cost of printing all jobs and utility dependencies are prices given to a set of related printing jobs.

13. The method as set forth in claim 12 wherein the costs of printing all jobs includes costs of toner and machine wear and tear, and the prices given to a set of related printing jobs represent prices customers are willing to pay.

14. The method as set forth in claim 1 wherein an integer programming (IP) encoding is generated over the heuristic for the optimal relaxed plan.

15. A method to print a set of print jobs in a printing or image rendering system having a print controller implementing the method, the controller-implemented method comprising:

heuristically searching a set of nodes for plans having dependencies between the set of print jobs, the dependencies including utility dependencies, including prices given to a related set of print jobs representing prices customers are willing to pay, represented in a general additive independence model that allows for changes in utility over sets of goals wherein the changes result from the utility of the sets of goals being different from the sum of utility of individual goals or the utility of the sets of goals being dependent on whether at least another goal is achieved and wherein, during search, for each unpromising node that is within a threshold tolerance of a current best solution, the unpromising node is kept with a probability proportional to how close the unpromising node is to the current best solution;

heuristically determining a relaxed plan of actions to complete the set of print jobs;

determining cost dependencies of the actions, including costs of printing all jobs, to complete the set of print jobs;

determining an optimal plan of action from the relaxed plan of actions based on the cost dependencies and the utility dependencies using an integer programming (IP) encoding; and, operating, by the print controller, the printing or image rendering system pursuant to a sequence of actions in the optimal plan of action to complete the set of print jobs.

16. The method as set forth in claim 15 wherein a heuristic for the optimal relaxed plan is:

$$h_{relax} = \operatorname*{MAX}_{P+} u(G_{P+}) - \sum_{a \in P+} C_a$$

where u($G_{P+}$) are the utilities of a set of goals, including the set of print jobs, achieved by the optimal relaxed plan (P+), a is an action, including completing the print jobs, and $C_a$ is a cost of an action a.

17. The method as set forth in claim 15 wherein the costs of printing all jobs includes costs of toner and machine wear and tear.

18. An image rendering or printing system to complete a set of print jobs, the system comprising:
a print controller configured to heuristically search a set of nodes for plans having dependencies between the set of print jobs, the dependencies including utility dependencies, including prices given to a related set of print jobs representing prices customers are willing to pay, represented in a general additive independence model that allows for changes in utility over sets of goals wherein the changes result from the utility of the sets of goals being different from the sum of utility of individual goals or the utility of the sets of goals being dependent on whether at least another goal is achieved and wherein, during search, for each unpromising node that is within a threshold tolerance of a current best solution, the unpromising node is kept with a probability proportional to how close the unpromising node is to the current best solution, heuristically determine a relaxed plan of actions to complete the set of print jobs, determine cost dependencies of the actions, including costs of printing all jobs, to complete the set of print jobs, determine an optimal plan of action from the relaxed plan of actions based on the cost dependencies and the utility dependencies wherein a heuristic for the optimal relaxed plan is:

$$h_{relax} = \mathop{\mathrm{MAX}}_{P+} u(G_{P+}) - \sum_{a \in P+} C_a$$

where $u(G_{,,})$ are the utilities of a set of goals, including the set of print jobs, achieved by the optimal relaxed plan (P+), a is an action, including completing the print jobs, and C, is a cost of an action a, and operate the image rendering or printing system pursuant to a sequence of actions in the optimal relaxed plan to complete the print jobs.

19. The system as set forth in claim 18 wherein the costs of printing all jobs includes costs of toner and machine wear and tear.

20. A system to complete a set of jobs, the system comprising:
a controller configured to heuristically search a set of nodes for plans having dependencies between the set of jobs, the dependencies including utility dependencies, including prices, represented in a general additive independence model that allows for changes in utility over sets of goals wherein the changes result from the utility of the sets of goals being different from the sum of utility of individual goals or the utility of the sets of goals being dependent on whether at least another goal is achieved and wherein, during search, for each unpromising node that is within a threshold tolerance of a current best solution, the unpromising node is kept with a probability proportional to how close the unpromising node is to the current best solution, heuristically determine a relaxed plan of actions to complete the set of jobs, determine cost dependencies of the actions, including costs of all jobs, to complete the set of jobs, determine an optimal plan of action from the relaxed plan of actions based on the cost dependencies and the utility dependencies wherein a heuristic for the optimal relaxed plan is:

$$h_{relax} = \mathop{\mathrm{MAX}}_{P+} u(G_{P+}) - \sum_{a \in P+} C_a$$

where $u(G1,)$ are the utilities of a set of goals, including the set of jobs, achieved by the optimal relaxed plan (P+), a is an action, including completing the jobs, and C', is a cost of an action a, wherein the controller is a print controller and is further configured to operate the system comprising a printing or image rendering system pursuant to a sequence of actions in the optimal relaxed plan to complete the jobs as a set of print jobs.

21. An image rendering or printing system to complete a set of print jobs, the system comprising:
a document processor;
a print controller configured to heuristically search a set of nodes for plans having dependencies between the set of print jobs, the dependencies including utility dependencies, including prices given to a related set of print jobs representing prices customers are willing to pay, represented in a general additive independence model that allows for changes in utility over sets of goals wherein the changes result from the utility of the sets of goals being different from the sum of utility of individual goals or the utility of the sets of goals being dependent on whether at least another goal is achieved and wherein, during search, for each unpromising node that is within a threshold tolerance of a current best solution, the unpromising node is kept with a probability proportional to how close the unpromising node is to the current best solution, heuristically determine a relaxed plan of actions to complete the set of print jobs, determine cost dependencies of the actions, including costs of printing all jobs, to complete the set of print jobs, determine an optimal plan of action from the relaxed plan of actions based on the cost dependencies and the utility dependencies, and operate the image rendering or printing system pursuant to a sequence of actions in the optimal relaxed plan to complete the print jobs; and,
a print engine configured to complete the print jobs pursuant to the optimal relaxed plan whereby a tradeoff between payments received from customers and cost of operating the system to complete the requested jobs is improved.

22. The system as set forth in claim 21 wherein the costs of printing all jobs includes costs of toner and machine wear and tear.

* * * * *